United States Patent [19]
Palm et al.

[11] Patent Number: 5,908,561
[45] Date of Patent: Jun. 1, 1999

[54] PURIFIED NATURAL GLASS PRODUCT

[75] Inventors: Scott K. Palm, Santa Maria; Qun Wang, Lompoc, both of Calif.

[73] Assignee: Advanced Minerals Corporation, Sana Barbara, Calif.

[21] Appl. No.: 08/587,199

[22] Filed: Jan. 16, 1996

[51] Int. Cl.⁶ .................................................. B01D 37/02
[52] U.S. Cl. ......................... 210/777; 210/778; 210/193; 210/502.1; 210/505
[58] Field of Search ................................... 210/777, 778, 210/193, 502.1, 505

[56] References Cited

U.S. PATENT DOCUMENTS

| | | | |
|---|---|---|---|
| 2,898,303 | 8/1959 | Houston . | |
| 3,839,227 | 10/1974 | Schlaefer et al. | 252/455 R |
| 3,944,687 | 3/1976 | Morisaki et al. . | |
| 4,134,857 | 1/1979 | Bradley et al. | 252/450 |
| 4,142,968 | 3/1979 | Nielsen et al. | 210/32 |
| 4,617,128 | 10/1986 | Ostreicher . | |
| 4,965,084 | 10/1990 | Austin et al. | 426/422 |
| 5,035,804 | 7/1991 | Stowe . | |

FOREIGN PATENT DOCUMENTS

| | | |
|---|---|---|
| 538140 | 6/1922 | France . |

OTHER PUBLICATIONS

Amercian Society of Brewing Chemists (1987), *Methods of Analysis of the American Society of Brewing Chemists,* 1987 Supplement, Section 4, pp. 1–2, "Iron Pickup by Beer"; Section 18, pp. 1–5, "Iron".

Bear, J. (1988), *Dynamics of Fluids in Porous Media* (New York: Dover Publications, Inc.), pp. 161–176.

Berry, L.G. et al. (1983), "Appendix A: Natural Glasses and Macerals," in *Mineralogy* (Second edition) (New York:Freeman and Co.); pp. 540–542.

Breese, R.O.Y. and Barker, J.M. (1994), "Perlite," in *Industrial Minerals and Rocks* (Littleton, Colorado:Society for Mining, Metallurgy, and Exploration, Inc.), pp. 735–749.

Cain, C.W. Jr. (1984), "Filter Aid, Use in Filtration," in *Encyclopedia of Chemical Processing and Design* (New York: Marcel Dekker), pp. 348–372.

Carman, P. (1937), "Fluid Flow Through Granular Beds," *Trans. Institution of Chem. Eng.,* pp. 150–166.

Geitgey, R.P. (1979), "Pumice and Volcanic Cinder," *Industrial Minerals and Rocks* (Littleton, Colorado: Society for Mining, Metallurgy, and Exploration, Inc.), pp. 803–813.

Heertjes, P. et al. (1949), "2. Studies in Filtration, Part I," *Recueil,* vol. 68, pp. 361–383.

Heertjes, P. et al. (1966), "Filter Blocking, Filter Media and Filter Aids," in *Solid–Liquid Separation* (London: Her Majesty's Stationery Office), pp. 37–43.

Kiefer, J., (1991), "Kieselguhr Filtration: Overview of Theoretical Principles," *Brauwelt International,* IV/1991, pp. 300–309.

Nordén, H., et al. (1994), "Application of Volume Balances and the Differential Diffusion Equation to Filtration," *Separation Science and Technology,*vol. 29(10), pp. 1319–1334.

Ruth, B. (1946), "Correlating Filtration Theory with Industrial Practice," *Industrial and Engineering Chemistry,* vol. 38(6), pp. 564–571.

Sperry, D. (1916), "The Principles of Filtration" *Metallurgical and Chemical Eng.,* vol. XV(4), pp. 198–203.

Tiller, F., et al. (1953), "The Role of Porosity in Filtration. Numerical Methods for Constant Rate and Constant Pressure Filtration Based on Kozeny's Law," *Chemical Engineering Progress,* vol. 49(9), pp. 467–479.

Tiller, F., et al. (1962), "The Role of Porosity in Filtration. Part V. Porosity Variation in Filter Cakes," *A.I.CH.E. Journal,* vol. 8(4), pp. 445–449.

Tiller, F., et al. (1964), "The Role of Porosity in Filtration. VI. New Definition of Filtration Resistance," *A.I.Ch.E. Journal,* vol. 10(1), pp. 61–67.

Patent Abstracts of Japan, vol. 006, No. 085, C–103, published May 22, 1982, pertaining to Japanese Patent Publication No. JP 57–17499 (Japanese Application No. JP 55–88615), published Jan. 29, 1982.

*Primary Examiner*—Ana Fortuna
*Attorney, Agent, or Firm*—Morrison & Foerster LLP

[57] ABSTRACT

This invention relates to purified natural glass products having low concentrations of soluble substances. More particularly, this invention relates to purified natural glass products having low slurry electrical conductivities (i.e., less than about 18 $\mu$S-cm$^{-1}$). Preferred embodiments are further characterized by low concentrations of soluble iron (i.e., less than about 2 mg Fe/kg product) and/or low concentrations of soluble aluminum (i.e., less than about 10 mg Al/kg product). These products may be prepared from natural glasses and natural glass products, including, for example, expanded perlite, pumice, expanded pumice, and volcanic ash. The products of the present invention retain the intricate and porous characteristics of the feed material but possess low concentrations of soluble substances, thereby permitting much greater utility, particularly in filtration applications.

70 Claims, No Drawings

PURIFIED NATURAL GLASS PRODUCT

BACKGROUND OF THE INVENTION

This invention relates to purified natural glass products having low concentrations of soluble substances. More particularly, this invention relates to purified natural glass products having low slurry electrical conductivities (i.e., less than about 18 $\mu$S-cm$^{-1}$). Preferred embodiments are further characterized by low concentrations of soluble iron (i.e., less than about 2 mg Fe/kg product) and/or low concentrations of soluble aluminum (i.e., less than about 10 mg Al/kg product). These products may be prepared from natural glasses and natural glass products, including, for example, expanded perlite, pumice, expanded pumice, and volcanic ash. The products of the present invention retain the intricate and porous characteristics of the feed material but possess low concentrations of soluble substances, thereby permitting much greater utility, particularly in filtration applications.

DESCRIPTION OF THE RELATED ART

Throughout this application, various publications, patents, and published patent applications are referred to by an identifying citation; full citations for these documents may be found at the end of the specification. The disclosure of the publications, patents, and published patent specifications referenced in this application are hereby incorporated by reference into the present disclosure to more fully describe the state of the art to which this invention pertains.

Many methods for the separation of particles from fluids employ porous siliceous media materials, such as diatomite, perlite, and pumice, as filter aids. The intricate porous structure unique to these siliceous materials is particularly effective for the physical entrapment of particles in filtration processes. The present invention relates to purified products derived from natural glasses and natural glass products which have particular utility in filtration applications and are hereinafter referred to as "purified natural glass products" or "purified natural glass filter aid products".

The term "natural glass" is used herein in the conventional sense and refers to natural glasses, commonly referred to as volcanic glasses, which are formed by the rapid cooling of siliceous magma or lava. Several types of natural glasses are known, including, for example, obsidian, pitchstone, perlite, and pumice. Obsidian is generally dark in color with a vitreous luster and a characteristic conchoidal fracture. Pitchstone has a waxy resinous luster and is frequently brown, green, or gray. Perlite is generally gray to green in color with abundant spherical cracks which cause it to break into small pearl-like masses. Pumice is a very lightweight glassy vesicular rock. Volcanic glasses such as perlite and pumice occur in massive deposits and find wide commercial use. Volcanic ash, often referred to as tuff when in consolidated form, consists of small particles or fragments which are often in glassy form; as used herein, the term natural glass encompasses volcanic ash.

Most natural glasses are chemically equivalent to rhyolite. Natural glasses which are chemically equivalent to trachyte, dacite, andesite, latite, and basalt are known but are less common. The term obsidian is generally applied to massive natural glasses that are rich in silica (i.e., $SiO_2$). Obsidian glasses may be classified into subcategories according to their silica content, with rhyolitic obsidians (containing typically about 73% $SiO_2$ by weight) as the most common (Berry et al., 1983).

Perlite is a hydrated natural glass containing typically about 72–75% $SiO_2$, 12–14% $Al_2O_3$, 0.5–2% $Fe_2O_3$, 3–5% $Na_2O$, 4–5% $K_2O$, 0.4–1.5% CaO (by weight), and small concentrations other metallic elements. Perlite is distinguished from other natural glasses by a higher content (2–5% by weight) of chemically bonded water, the presence of a vitreous, pearly luster, and characteristic concentric or arcurate onion skin-like (i.e., perlitic) fractures.

Perlite products are often prepared by milling and thermal expansion, and possess unique physical properties such as high porosity, low bulk density, and chemical inertness. Depending on their quality and processing, perlite products are used as filter aids, lightweight insulating materials, filler materials, and chemical carriers. Expanded perlite has been used in filtration applications since about the late 1940's (Breese and Barker, 1994). Expanded perlite is also used as an absorbent for treating oil spills (e.g., Stowe, 1991).

Conventional processing of perlite consists of comminution (crushing and grinding), air size classification, thermal expansion, and air size classification of the expanded material to meet the specification of the finished product. For example, perlite ore is crushed, ground, and classified to a predetermined particle size range (e.g., passing 30 mesh), then the classified material is heated in air at a temperature of 870–1100° C. in an expansion furnace, where the simultaneous softening of the glass and vaporization of contained water leads to rapid expansion of glass particles to form a frothy glass material with a bulk volume up to 20 times that of the unexpanded ore. The expanded perlite is then air classified to meet the size specification of the final product. The expanded perlite product may further be milled and classified for use as filter aid or filler material (Breese and Barker, 1994). The presence of chemically bonded water in other natural glasses (for example, pumice and volcanic ash) often permits "thermal expansion" in a manner analogous to that commonly used for perlite.

Pumice is a natural glass characterized by mesoporous structure (e.g., having pores or vesicles with a size up to about 1 mm). The highly porous nature of pumice gives it a very low apparent density, in many cases allowing it to float on the surface of water. Most commercial pumice contains from about 60 to about 70% $SiO_2$ by weight. Pumice is typically processed by milling and classification (as described above for perlite), and products are primarily used as lightweight aggregates and also as abrasives, absorbents, and fillers. Unexpanded pumice and thermally expanded pumice (prepared in a manner analogous to that used for perlite) may also be used as filter aids in some cases (Geitgey, 1994).

Natural glass products, including, for example, expanded perlite, pumice, and expanded pumice have found widespread utility in filtration applications. The term "filtration" is used herein in the conventional sense and refers to the removal of particulate matter from a fluid in which the particulate matter is suspended. A common filtration process is one which comprises the step of passing the fluid through a filter aid material supported on a septum (e.g., mesh screen, membrane, or pad). The working principles of filtration using porous media have been developed over many years (Carman, 1937; Heertjes, 1949, 1966; Ruth, 1946; Sperry, 1916; Tiller, 1953, 1962, 1964), and have been recently reviewed in detail from both practical perspectives (Cain, 1984; Kiefer, 1991) as well as from their underlying theoretical principles (Bear, 1988; Norden, 1994).

The intricate porous structure of many natural glass products, including, for example, expanded perlite, pumice, and expanded pumice, is particularly effective for the physical entrapment of particles in filtration processes. For example, natural glass products are often applied to a septum to improve clarity and increase flow rate in filtration processes, in a step sometimes referred to as "precoating." Natural glass products are also often added directly to a fluid as it is being filtered to reduce the loading of undesirable particulate at the septum while maintaining a designed liquid flow rate, in a step often referred to as "body feeding." Depending on particular separation involved, natural glass products may be used in precoating, body feeding, or both.

In some filtration applications, different natural glass products (e.g., different grades and/or different natural glass products) are blended together to further modify or optimize the filtration process. Also, natural glass products are sometimes combined with other substances. In some cases, these combinations may involve simple mixtures, for example, with other filter aid components, including, for example, diatomite, cellulose, activated charcoal, clay, or other materials. In other cases, these combinations are composites in which natural glass products are intimately compounded with other ingredients to make sheets, pads, or cartridges. Still more elaborate modifications of any of these natural glass products are used for filtration or separation, involving, for example, surface treatment and the addition of chemicals to natural glass products, mixtures, or their composites. In certain circumstances, perlite products, especially those which are surface treated, may also exhibit unique properties during filtration that can greatly enhance clarification or purification of a fluid (Ostreicher, 1986).

The intricate and porous structure of many natural glass products, including, for example, expanded perlite, pumice, and expanded pumice, also provides them with unique filler properties. For example, expanded perlite products are often used as insulating fillers, resin fillers, and in the manufacture of textured coatings.

Many natural glass products, such as perlite and pumice products, are aluminosilicates and are therefore essentially chemically inert in most environments. As naturally occurring glasses, they also contain various impurities such as mineral grains, fluid inclusions, and surface contaminants. When placed in contact with a fluid phase (for example, when used as a filter aid or as a filler), soluble substances may be released from the natural glass product into the filtrates or the filled products, greatly diminishing the quality of the fluid. These soluble substances may be detrimental to the quality of the products where contamination needs to be carefully controlled. As ingredients in polymers, plastics, paints, coatings, and other formulations, natural glass products, such as perlite and pumice products, also come into contact with most of the other ingredients in the formulation. For this reason, natural glass products with high purity, surface cleanliness and low chemical reactivity are often desirable.

As used herein, the term "soluble substances" relates to components of a natural glass product which (i) are dissolved in a fluid when the natural glass product is placed in contact with that fluid; and which (ii) contribute to the resulting electrical conductivity of the fluid. Soluble substances of particular interest are those containing iron (i.e., Fe) and/or aluminum (i.e., Al) which yield dissolved iron ions (e.g., $Fe^{+2}$, $Fe^{+3}$) and dissolved aluminum ions (e.g., $Al^{+3}$).

Fluids of particular interest are those containing water. Soluble substances of particular interest are those which are soluble in water or other aqueous media.

Results of tests for the concentrations of soluble substances of commercially available expanded perlite products from worldwide sources (using the standard methods described below) are shown below in Table I. The lowest value of beer soluble iron (BSI) was found to be 3 mg Fe/kg product and the lowest value of beer soluble aluminum (BSAl) was found to be 11 mg Al/kg product.

TABLE I

| Samples | | | BSI | BSA1 | Conductivity |
|---|---|---|---|---|---|
| Brand | Grade | Origin | mg/kg | mg/kg | µS/cm |
| HARBORLITE | 2000 | US | 4 | 16 | 33.8 |
| HARBORLITE | 200 | US | 4 | 52 | 90.9 |
| HARBORLITE | J250S | England | 4 | 31 | 31.8 |
| HARBORLITE | PF | England | 11 | 25 | 54.4 |
| HARBORLITE | J208 | France | 13 | 47 | 42.2 |
| HARBORLITE | 130/21S | France | 9 | 267 | 86.6 |
| PERFILTRA | 443 | Brazil | 3 | 179 | 35.0 |
| PERFILTRA | 807 | Brazil | 3 | 39 | 58.7 |
| DICALITE | 447 | Mexico | 13 | 51 | 88.9 |
| DICALITE | 4147 | Mexico | 12 | 43 | 40.0 |
| DICALITE | 4408 | Europe | 4 | 19 | 38.5 |
| NORDISK | NP#30 | Norway | 5 | 17 | 20.5 |
| WINKELMANN | W12 | Europe | 14 | 11 | 75.1 |
| WINKELMANN | W28 | Europe | 8 | 18 | 22.5 |
| CECA | FLO4 | Europe | 9 | 20 | 31.5 |
| CECA | FLOR | Europe | 6 | 15 | 38.0 |
| SEITZ | Perlite A | Europe | 17 | 17 | 34.2 |

A method of leaching ground (unexpanded) perlite with a solution of an inorganic acid prior to thermal expansion has been described (Houston, 1959). By this method, the expansion characteristics of perlite ore, and a filter aid prepared from the resulting expanded perlite, was found to have modified flow rate characteristics and improved light reflecting properties. The reference, however, does not pertain to the reduction of the concentration of soluble substances. In contrast, the purified natural glass products and purified natural glass filter aid products of the present invention are purified so as to reduce the concentrations of soluble substances.

A method of using tannic acid (also known as gallotannic acid or tannin, with a typical chemical formula of $C_{76}H_{52}O_{46}$) or gallic acid (also known as 3,4,5-trihydroxybenzoic acid, $C_7H_6O_5$) to produce a low beverage soluble iron content filter aid has been disclosed (Bradley and McAdam, 1979). In this method, tannic or gallic acid is first mixed with the filter aid and, subsequently, the treated material is either thermally dried directly, or filtered and rinsed with purified water to remove excess acid and then thermally dried. The lower concentration of beverage soluble iron in the resulting product is achieved by surface fixation of the metal by the complexing acid; that is, the metal remains in the product, but in complexed, and therefore insoluble, form. In practice, however, the presence of residual acid (which is essential to this fixation method) is undesirable in many applications. In contrast, the purified natural glass products and purified natural glass filter aid products of the present invention have low concentrations of soluble substances (including, but often not merely, beverage soluble iron), and are also free of acid residues.

A method for preparing a preservative for green fodder which involves mixing expanded perlite with an acid has been presented (Jung, 1963). Also, a method of preparing purifying agents consisting of activated siliceous porous mineral substances has also been described (Morisaki and Watanabe, 1976); in this method, siliceous material, such as expanded perlite, is mixed and baked with hydrochloric and/or sulfuric acid, and resulting solubilized metals in the siliceous material act as coagulants or coagulation sites for fine particles for waste water treatment. In both methods, the acid remains with the treated materials. Furthermore, the references do not contemplate applications for the resulting treated materials which require low concentrations of soluble substances.

The purified natural glass products and purified natural glass filter aid products of the present invention retain the intricate porous structure unique to these natural glasses, such as expanded perlite or pumice, but have very low concentrations of soluble substances, thereby permitting much greater utility, particularly as filter aids or fillers for products for which contamination by the soluble substances must be carefully controlled.

SUMMARY OF THE INVENTION

One aspect of the present invention pertains to purified natural glass products having a low concentration of soluble substances as defined by a slurry electrical conductivity of less than about 18 $\mu$S-cm$^{-1}$, preferably less than about 15 $\mu$S-cm$^{-1}$, more preferably less than about 10 $\mu$S-cm$^{-1}$, yet more preferably less than about 8 $\mu$S-cm$^{-1}$. In a preferred embodiment, the purified natural glass product is further characterized by a beer soluble iron content of less than about 2 mg Fe/kg product, more preferably equal to or less than about 1 mg Fe/kg product. In another preferred embodiment, the purified natural glass product is further characterized by a beer soluble aluminum content of less than about 10 mg Al/kg product, more preferably less than 8 mg Al/kg product, still more preferably less than about 5 mg Al/kg product, yet more preferably less than about 1 mg Al/kg product. In still another preferred embodiment, the purified natural glass product is further characterized by a beer soluble iron content of less than about 2 mg Fe/kg product and a beer soluble aluminum content of less than about 10 mg Al/kg product. In a preferred embodiment, the purified natural glass product is derived from expanded perlite, pumice, expanded pumice, or volcanic ash.

Another aspect of the present invention pertains to filter aid compositions (i.e., filter composite media) comprising a purified natural glass product as described herein. In a preferred embodiment, the filter composite medium is in the form of a mixture (i.e., with one or more other filter aid components, including, for example, diatomite, cellulose, activated charcoal, and clay). In another preferred embodiment, the filter composite medium is in the form of a sheet, a pad, or a cartridge.

Still another aspect of the present invention pertains to methods of filtration comprising the step of passing a fluid containing suspended particulates through a filter aid material supported on a septum, wherein said filter aid material is a purified natural glass product as described herein. In a preferred embodiment, the method of filtration involves filtration of a fluid and/or fluid suspension comprising water, beverage, a botanical extract, an animal extract, a fermentation broth, blood or blood products, a vaccine, or a chemical.

DESCRIPTION OF THE PREFERRED EMBODIMENTS

A. Methods for Preparing the Purified Natural Glass Products and Purified Natural Glass Filter Aid Products of the Invention As described above, the purified natural glass products and purified natural glass filter aid products of the present invention have low concentrations of soluble substances and retain the intricate and porous characteristics of the feed material. Any known method for preparing the purified natural glass products and purified natural glass filter aid products of the present invention may be used.

One preferred method of preparing the products of the present invention is by controlled acid leaching. This method effects cleaning of the feed material's surface and removes soluble substances from the natural glass, resulting in the desirable low concentrations of soluble substances.

Feed material, such as commercially available feed materials, may be used. For example, for preparation of perlite products, HARBORLITE 2000 (from Harborlite Corporation, Vicksburg, Mich.) is a useful feed material. Gravity separation, for example, hydrocyclone separation, may be used to further upgrade the feed material to remove less porous particles (for example, unexpanded perlite) and mineral impurities.

The feed material may be leached, for example, by stirring in a slurry of feed material and an acid solution. The acid solution may comprise inorganic or organic acids, for example, sulfuric acid (i.e., $H_2SO_4$), hydrochloric acid (i.e., HCl), nitric acid (i.e., $HNO_3$), phosphoric acid (i.e., $H_3PO_4$), acetic acid (i.e., $CH_3COOH$) or citric acid (i.e., $C_6H_3O_7.H_2O$), or combinations the Natural glass has a much higher solubility in hydrofluoric acid (i.e., HF) and ammonium bifluoride (i.e., $NH_4F.HF$). Leaching by these latter chemicals can result in a loss of the intricate porous structure of the natural glass, and should therefore be used only under strictly controlled conditions to provide slight surface etching.

Leaching may be conducted at either ambient conditions (e.g., room temperature, atmospheric pressure) or with heating and/or under pressurized conditions. Parameters such as solids content (i.e., the weight ratio of solid to liquid), acid concentrations, and leaching conditions, such as temperature, pressure, and leaching time, may be optimized on the basis of the properties of the feed material and the acid selected to achieve the desired level of solubility in the final product. Examples of typical parameters include: solids content of from about 1:5 to about 1:100; acid concentrations of from about 0.01 moles/liter to about 15 moles/liter (i.e., "concentrated"); leaching temperatures of from about room temperature (i.e., 20° C.) to about 250° C., more usually about 100° C.; leaching pressures of from about 0.1 atmosphere to about 20 atmospheres, more usually about 1 atmosphere; and leaching time of from about 10 min to about 10 hours, more usually about 1–2 hours.

The leached material is dewatered, for example, by filtration, to remove the spent acid and the solubilized substances, and subsequently rinsed with purified (e.g., distilled, deionized, or equivalent quality) water. The electrical conductivity of the filtrates and washes is carefully monitored to ensure a thorough rinse. Rinsing with a solution of a chelating agent such as citric acid or ammonium citrate and redispersion of the filter cake in purified water may be used to further reduce the level of solubilities. The dewatered and rinsed material is then thermally dried, for example, in air at about 110° C. to approximately constant weight.

B. Methods for Characterizing the Purified Natural Glass Products and Purified Natural Glass Filter Aid Products of the Invention 1. Slurry Electrical Conductivity Pure water is a very poor conductor of electricity. The electrical conductivity of water is increased by the presence of dissolved electrolytes (e.g., cations and anions). The electrical conductivity of a slurry of a solid powder in purified water, hereinafter referred to as the slurry electrical conductivity, provides a means of evaluating the total concentration of water soluble electrolytes in the solid material. The greater the conductivity of the slurry, the greater the concentration of water soluble electrolytes (i.e., soluble substances) in the solid powder.

In the present disclosure, the slurry electrical conductivity was determined using a conductivity cell by measuring the conductivity of the supernatant of a 10% (w/v) slurry made from a powder product and deionized water. The sample material is dried to constant weight at 110° C. in air, and subsequently allowed to cool to room temperature in air (i.e., dried). A 10 g sample is added to a 250 mL beaker containing 100 mL of distilled or deionized water with a maximum electrical conductivity of less than 1 microsiemens per centimeter (<1 $\mu$S-cm$^{-1}$). The mixture is swirled for 15 sec to fully suspend the slurry, then allowed to settle. The mixture is swirled again after 15 min, and allowed to settle for not less than 1 hr. The supernatant is decanted into a cell tube, and a conductivity cell (Cole-Parmer Instrument Co. Electric Conductivity Meter, Model 1481–61, with a 500 series cell) dipped into the liquid. The cell is moved up and down several times to release any air bubbles trapped in the cell, and the resistivity measured using the conductivity bridge contained within the meter. The conductivity cell is calibrated (to obtain a cell calibration constant) with solutions of known electrical conductivity.

The purified natural glass products and purified natural glass filter aid products of the present invention have an electrical conductivity of less than 18 $\mu$S-cm$^{-1}$ (usually in the range of from about 0.5 to about 18 $\mu$S-cm$^{-1}$), preferably less than 15 $\mu$S-cm$^{-1}$ (usually in the range of from about 0.5 to about 15 $\mu$S-cm$^{-1}$), more preferably less than 10 $\mu$S-cm$^{-1}$ (usually in the range of from about 0.5 to about 10 $\mu$S-cm$^{-1}$), yet more preferably less than 8 $\mu$S-cm$^{-1}$ (usually in the range of from about 0.5 to about 8 $\mu$S-cm$^{-1}$). Compared with the electrical conductivities of conventional perlite filter aids, which are typically greater than 20 $\mu$S-cm$^{-1}$ (as shown in Table I), this represents a significant reduction in concentration of soluble substances in the purified natural glass products of the present invention.

2. Beer Soluble Iron (BSI) and Beer Soluble Aluminum (BSAl)

Large volumes of perlite and other filter aid products are used to filter beverages and fermentation broths. Beer is a convenient and well characterized example of such an application. Contamination of the filtered liquids with metals such as iron (i.e., Fe, as the ions $Fe^{2+}$ and/or $Fe^{3+}$) or aluminum (i.e., Al, as the ion $Al^{3+}$) is often of concern.

A reliable analytical method has been established in the brewing industry to determine the solubility of iron from filter aid products in beer (beer soluble iron, or BSI) (American Society of Brewing Chemists, 1987). The preferred analytical method used in the present invention involves extraction with decarbonated beer and determination of extracted iron concentration in the beer filtrate using a colorimetric method.

The sample is dried to constant weight at 110° C. in air, and subsequently allowed to cool to room temperature in air (i.e., dried). A 5 g sample is added to 200 mL of decarbonated beer (in this case, BUDWEISER, registered trademark of Anheuser-Busch) at room temperature, and the mixture swirled intermittently for an elapsed time of 5 min and 50 sec. The mixture is then immediately transferred to a funnel containing 25 cm diameter filter paper, from which the filtrate collected during the first 30 sec is discarded. Filtrate is collected for the next 150 sec, and a 25 mL portion is treated with approximately 25 mg of ascorbic acid (i.e., $C_6H_8O_6$), to reduce dissolved iron ions to the ferrous (i.e., $Fe^{2+}$) state (thus yielding "sample extract"). The color is developed by addition of 1 mL of 0.3% (w/v) 1,10-phenanthroline (i.e., o-phenanthroline, $C_{12}H_8N_2$), and, after 30 min, the absorbance of the resulting sample solution is compared to a standard calibration curve. The calibration curve is prepared from standard iron solutions of known concentration in beer. Untreated filtrate is used as a method blank to correct for turbidity and color. Absorbance is measured at 505 nm using a spectrophotometer, in this case, a Milton & Bradley Spectronic. The quantitation limit of this method is approximately 1 mg Fe/kg product.

The preferred method for determining the solubility of aluminum from filter aid products in beer (beer soluble aluminum, or BSAl) in this invention uses graphite furnace atomic absorption spectrophotometry (GFAAS). Sample extracts are prepared according to the American Society of Brewing Chemists method for beer soluble iron (as described above), and centrifuged to removed suspended fine particles. Beer samples with aluminum concentration exceeding the optimum range of analysis are appropriately diluted. Aluminum concentration in the samples is corrected by the amount of aluminum present in the same beer used for extraction in order to calculate the amount of aluminum dissolved from the solids. The method has a quantitation limit of 0.2 mg Al/kg product.

The purified natural glass products and purified natural glass filter aid products of the present invention have a beer soluble iron (BSI) content of less than about 2 mg Fe/kg product (usually in the range of from about the quantitation limit to about 2 mg Fe/kg product) and a beer soluble aluminum (BSAl) content of less than about 10 mg Al/kg product (usually in the range of from about 0.5 to about 10 mg Al/kg product); preferably a beer soluble iron (BSI) content of less than about 2 mg Fe/kg product (usually in the range of from about the quantitation limit to about 2 mg Fe/kg product) and a beer soluble aluminum (BSAl) content of less than about 8 mg Al/kg product (usually in the range of from about 0.5 to about 8 mg Al/kg product); more preferably a beer soluble iron (BSI) content of less than about 2 mg Fe/kg product (usually in the range of from about the quantitation limit to about 2 mg Fe/kg product) and a beer soluble aluminum (BSAl) content of less than about 5 mg Al/kg product (usually in the range of from about 0.5 to about 5 mg Al/kg product); still more preferably a beer soluble iron (BSI) content of equal to or less than about 1 mg Fe/kg product (usually at or below the quantitation limit) and a beer soluble aluminum (BSAl) content of less than about 1 mg Al/kg product (usually in the range of from about 0.5 to about 1 mg Al/kg product). Compared with the beer soluble iron and beer soluble aluminum contents of conventional perlite filter aids, which are typically greater than 3 mg Fe/kg product and greater than 10 mg Al/kg product, these represent a significant reduction in the concentrations of beer soluble iron and/or beer soluble aluminum in the purified natural glass products of the present invention.

C. Methods of Using the Purified Natural Glass Products and Purified Natural Glass Filter Aid Products of the Invention The purified natural glass products of the present invention can be used in a manner analogous to the currently available natural glass products, including, for example, as a filter aid and as a filler.

The intricate porous structure unique to these natural glass materials is particularly effective for the physical entrapment of particles in filtration processes. Furthermore, the very low concentrations of soluble substances of these products permit greater utility in the filtration of the fluids for which the soluble substances from filter aid must be carefully controlled.

The purified natural glass products of the present invention can be applied to a septum (i.e., used in precoating) to improve clarity and increase flow rate in filtration processes. They can also be added directly to a fluid as it is being filtered to reduce the loading of undesirable particulates at the septum while maintaining a designed liquid flow rate (i.e., used in "body feeding").

In some filtration applications, the purified natural glass products of the present invention can be used as mixtures with other filter aids or as composites (i.e., as composite filter media) in which they are intimately compounded with other ingredients to make sheets, pads, or cartridges.

The purified natural glass product of the present invention can also be used as the base material for more elaborate modifications, involving, for example, surface treatment. In certain circumstances, purified natural glass products, especially those which are surface treated, may also exhibit unique properties during filtration which can greatly enhance clarification or purification of a fluid or achieve selective removal of undesired substances.

The purified natural glass products of the present invention may be used as a filter aid in filtration; that is, for the removal of particulate matter from a fluid in which the particulate matter is suspended, in a method comprising the step of passing the fluid containing suspended particulates through a purified natural glass products of the present invention (i.e., as a filter aid material) supported on a septum.

Examples of fluids and/or fluid suspensions which may be filtered using the purified natural glass products of the present invention include: water, beverages (for example, beer, fruit juice), botanical extracts (for example, sugar solutions, vegetable oils, flavors, antibiotics), animal extracts (for example, fats, oils), fermentation broths (for example, cell suspensions and cell cultures, including, for example, yeast extracts, bacterial broths), blood and blood products (for example, whole blood, blood plasma, serum albumin, immunoglobulins), vaccines (for example, pertussis vaccine), and chemicals (for example, organic and inorganic chemicals including, for example, solvents such as methanol, and solutions such as aqueous sodium hypophosphite).

D. Examples

Purified natural glass products of the present invention and methods for their preparation are described in the following examples, which are offered by way of illustration and not by way of limitation.

Commercially available expanded perlite products, HARBORLITE 2000 and HARBORLITE 200 (from Harborlite Corporation, Vicksburg, Mich.) were used as feed materials. The HARBORLITE 2000 had a particle size distribution (PSD) as determined by a laser diffraction method between 20 $\mu$m ($d_{10}$) and 108 $\mu$m ($d_{90}$), and the HARBORLITE 200 had a PSD between 5.5 $\mu$m ($d_{10}$) and 43 $\mu$m ($d_{90}$). Two batches of each of the two feed materials were leached in a 0.5N sulfuric acid (i.e., $H_2SO_4$) solution with a solids content (i.e., weight ratio of solid to liquid) of 1:20 (for batch 1) and 1:10 (for batch 2), at the temperature of boiling for 60 minutes. The leached products were filtered in a 15 cm Buchner filter and the filter cakes were rinsed with deionized water until the filtrates showed a conductivity less than 3 $\mu$S-cm$^{-1}$. The quantity of rinse water used was about 5 times the volume of the acid solution used in leaching. The cakes were then dried in air in an oven overnight at 120° C.

Tests to determine the concentration of soluble substances were carried out according to the methods described above. The results for both the purified products of the present invention and the feed materials are compared in Table II. The products of this example had electrical conductivities of less than 7 $\mu$S-cm$^{-1}$, beer soluble iron contents of less than 2 mg Fe/kg product, and beer soluble aluminum contents of less than 5 mg Al/kg. Particle size distributions of the products were determined to be essentially identical to those of the feed materials.

TABLE II

| Product | BSI mg/kg | BSA1 mg/kg | Conductivity $\mu$S/cm |
|---|---|---|---|
| Conventional Harborlite 2000 (US) | 4 | 16 | 33.8 |
| Equivalent purified glass product - Batch 1 | <1 | 0.8 | not det'd |
| Equivalent purified glass product - Batch 2 | <1 | 2.0 | 6.2 |
| Conventional Harborlite 200 (US) | 4 | 52 | 90.9 |
| Equivalent purified glass product - Batch 1 | <1 | 0.8 | not det'd |
| Equivalent purified glass product - Batch 2 | 1 | 4.0 | 6.5 |

E. References

The disclosures of the publications, patents, and published patent specifications referenced below are hereby incorporated by reference into the present disclosure to more fully describe the state of the art to which this invention pertains.

American Society of Brewing Chemists (1987), *Methods of Analysis of the American Society of Brewing Chemists*.

Bradley, T. G. and McAdam, R. L. (1979), U.S. Pat. No. 4,134,857.

Bear, J. (1988), *Dynamics of Fluids in Porous Media* (New York: Dover Publications, Inc.), pp. 161–176.

Berry, L. G. et al. (1983), *Mineralogy* (Second edition) (New York: Freeman and Co.); pp. 540–542.

Breese, R. O. Y. and Barker, J. M. (1994), In *Industrial Minerals and Rocks* (Littleton, Colo.: Society for Mining, Metallurgy, and Exploration, Inc.), pp. 735–749.

Cain, C. W. Jr. (1984), In *Encyclopedia of Chemical Processing and Design* (New York: Marcel Dekker), pp. 348–372.

Carman, P. (1937), *Trans. Institution of Chem. Eng.*, pp. 150–166.

Geitgey, R. P. (1979), In *Industrial Minerals and Rocks* (Littleton, Colo.: Society for Mining, Metallurgy, and Exploration, Inc.), pp. 803–813.

Heertjes, P. et al. (1949), *Recueil*, Vol. 68, pp. 361–383.

Heertjes, P. et al. (1966), in *Solid-Liquid Separation* (London: Her Majesty's Stationery Office), pp. 37–43.

Houston, H. H. (1959), U.S. Pat. No. 2,898,303.

Jung, J. (1965), Belgium Patent 657,019.

Kiefer, J., (1991), *Brauwelt International*, IV/1991, pp. 300–309.

Morisaki, K. and Watanabe, M. (1976), U.S. Pat. No. 3,944,687.

Norden, H., et al. (1994), *Separation Science and Technology*, Vol. 29(10), pp. 1319–1334. Ostreicher, E. A. (1986), U.S. Pat. No. 4,617,128.

Ruth, B. (1946), *Industrial and Engineering Chemistry*, Vol. 38(6), pp. 564–571.

Sperry, D. (1916), *Metallurgical and Chemical Eng.*, Vol. XV(4), pp. 198–203.

Stowe, G. B. (1991), U.S. Pat. No. 5,035,804.

Tiller, F., et al. (1953), *Chemical Engineering Progress*, Vol. 49(9), pp. 467–479.

Tiller, F., et al. (1962), *A.I.Ch.E. Journal*, Vol. 8(4), pp. 445–449.

Tiller, F., et al. (1964), *A.I.Ch.E. Journal*, Vol. 10(1), pp. 61–67.

We claim:

1. A purified thermally expanded natural glass product, said product having a low concentration of soluble substances as defined by a slurry electrical conductivity of less than 10 $\mu$S-cm$^{-1}$.

2. The product of claim 1, wherein said product has a low concentration of soluble substances as defined by a slurry electrical conductivity of less than 8 $\mu$S-cm$^{-1}$.

3. The product of claim 1, wherein said product is further characterized by a beer soluble iron content of less than 2 mg Fe/kg product.

4. The product of claim 3, wherein said product is further characterized by a beer soluble aluminum content of less than 5 mg Al/kg product.

5. The product of claim 3, wherein said product is further characterized by a beer soluble aluminum content of less than 1 mg Al/kg product.

6. A filter composite medium comprising a product according to claim 3.

7. A method of filtration comprising the step of passing a fluid containing suspended particulates through a filter aid material supported on a septum, wherein said filter aid material comprises a product according to claim 3.

8. The product of claim 1, wherein said product is further characterized by a beer soluble iron content of equal to or less than 1 mg Fe/kg product.

9. The product of claim 1, wherein said product is further characterized by a beer soluble aluminum content of less than 10 mg Al/kg product.

10. A filter composite medium comprising a product according to claim 9.

11. A method of filtration comprising the step of passing a fluid containing suspended particulates through a filter aid material supported on a septum, wherein said filter aid material comprises a product according to claim 9.

12. The product of claim 1, wherein said product is further characterized by a beer soluble aluminum content of less than 8 mg Al/kg product.

13. The product of claim 1, wherein said product is further characterized by a beer soluble iron content of less than 2 mg Fe/kg product and a beer soluble aluminum content of less than 10 mg Al/kg product.

14. A filter composite medium comprising a product according to claim 13.

15. A method of filtration comprising the step of passing a fluid containing suspended particulates through a filter aid material supported on a septum, wherein said filter aid material comprises a product according to claim 13.

16. The product of claim 1, wherein said product is derived from expanded perlite.

17. The product of claim 1, wherein said product is derived from pumice.

18. The product of claim 1, wherein said product is derived from expanded pumice.

19. The product of claim 1, wherein said product is derived from volcanic ash.

20. A filter composite medium comprising a product according to claim 1.

21. The medium of claim 20, wherein said medium is a mixture of said product and at least one other filter aid component.

22. The medium of claim 20, wherein said medium is in the form of a sheet.

23. The medium of claim 20, wherein said medium is in the form of a pad.

24. The medium of claim 20, wherein said medium is in the form of a cartridge.

25. A method of filtration comprising the step of passing a fluid containing suspended particulates through a filter aid material supported on a septum, wherein said filter aid material comprises a product according to claim 1.

26. The method of filtration of claim 25, wherein said fluid comprises water.

27. The method of filtration of claim 25, wherein said fluid comprises beverage.

28. The method of filtration of claim 25, wherein said fluid comprises a botanical extract.

29. The method of filtration of claim 25, wherein said fluid comprises an animal extract.

30. The method of filtration of claim 25, wherein said fluid comprises a fermentation broth.

31. The method of filtration of claim 25, wherein said fluid comprises blood or blood products.

32. The method of filtration of claim 25, wherein said fluid comprises a vaccine.

33. The method of filtration of claim 25, wherein said fluid comprises a chemical.

34. A purified thermally expanded perlite product, said product having a low concentration of soluble substances as defined by a slurry electrical conductivity of less than 10 $\mu$S-cm$^{-1}$.

35. The purified thermally expanded perlite product of claim 34, wherein said product has a low concentration of soluble substances as defined by a slurry electrical conductivity of less than 8 $\mu$S-cm$^{-1}$.

36. The product of claim 34, wherein said product is further characterized by a beer soluble iron content of less than 2 mg Fe/kg product.

37. The product of claim 36, wherein said product is further characterized by a beer soluble aluminum content of less than 5 mg Al/kg product.

38. The product of claim 36, wherein said product is further characterized by a beer soluble aluminum content of less than 1 mg Al/kg product.

39. The product of claim 34, wherein said product is further characterized by a beer soluble iron content of equal to or less than 1 mg Fe/kg product.

40. The product of claim 34, wherein said product is further characterized by a beer soluble aluminum content of less than 10 mg Al/kg product.

41. The product of claim 34, wherein said product is further characterized by a beer soluble aluminum content of less than 8 mg Al/kg product.

42. The product of claim 34, wherein said product is further characterized by a beer soluble iron content of less than 2 mg Fe/kg product and a beer soluble aluminum content of less than 10 mg Al/kg product.

43. A filter composite medium comprising a product according to claim 34.

44. A method of filtration comprising the step of passing a fluid containing suspended particulates through a filter aid material supported on a septum, wherein said filter aid material comprises a product according to claim 34.

45. A purified thermally expanded natural glass product, said product having a low concentration of soluble substances as defined by a slurry electrical conductivity of less than 10 $\mu$S-cm$^{-1}$, said product being essentially free of gallic acid, tannic acid, ethylene diamine tetraacetic acid, and other chelating agents, and salts thereof.

46. The product of claim 45, wherein said product has a low concentration of soluble substances as defined by a slurry electrical conductivity of less than 8 $\mu$S-cm$^{-1}$.

47. The product of claim 45, wherein said product is further characterized by a beer soluble iron content of less than 2 mg Fe/kg product.

48. The product of claim 47, wherein said product is further characterized by a beer soluble aluminum content of less than 5 mg Al/kg product.

49. The product of claim 47, wherein said product is further characterized by a beer soluble aluminum content of less than 1 mg Al/kg product.

50. The product of claim 45, wherein said product is further characterized by a beer soluble iron content of equal to or less than 1 mg Fe/kg product.

51. The product of claim 45, wherein said product is further characterized by a beer soluble aluminum content of less than 10 mg Al/kg product.

52. The product of claim 49, wherein said product is further characterized by a beer soluble aluminum content of less than 8 mg Al/kg product.

53. The product of claim 45, wherein said product is further characterized by a beer soluble iron content of less than 2 mg Fe/kg product and a beer soluble aluminum content of less than 10 mg Al/kg product.

54. The product of claim 45, wherein said product is derived from expanded perlite.

55. The product of claim 45, wherein said product is derived from pumice.

56. The product of claim 45, wherein said product is derived from expanded pumice.

57. The product of claim 45, wherein said product is derived from volcanic ash.

58. A filter composite medium comprising a product according to claim 45.

59. A method of filtration comprising the step of passing a fluid containing suspended particulates through a filter aid material supported on a septum, wherein said filter aid material comprises a product according to claim 45.

60. A purified thermally expanded perlite product, said product having a low concentration of soluble substances as defined by a slurry electrical conductivity of less than 10 $\mu$S-cm$^{-1}$, said product being essentially free of gallic acid, tannic acid, ethylene diamine tetraacetic acid, and other chelating agents, and salts thereof.

61. The purified thermally expanded perlite product of claim 60, wherein said product has a low concentration of soluble substances as defined by a slurry electrical conductivity of less than 8 $\mu$S-cm$^{-1}$.

62. The product of claim 60, wherein said product is further characterized by a beer soluble iron content of less than 2 mg Fe/kg product.

63. The product of claim 62, wherein said product is further characterized by a beer soluble aluminum content of less than 5 mg Al/kg product.

64. The product of claim 62, wherein said product is further characterized by a beer soluble aluminum content of less than 1 mg Al/kg product.

65. The product of claim 60, wherein said product is further characterized by a beer soluble iron content of equal to or less than 1 mg Fe/kg product.

66. The product of claim 60, wherein said product is further characterized by a beer soluble aluminum content of less than 10 mg Al/kg product.

67. The product of claim 60, wherein said product is further characterized by a beer soluble aluminum content of less than 8 mg Al/kg product.

68. The product of claim 60, wherein said product is further characterized by a beer soluble iron content of less than 2 mg Fe/kg product and a beer soluble aluminum content of less than 10 mg Al/kg product.

69. A filter composite medium comprising a product according to claim 60.

70. A method of filtration comprising the step of passing a fluid containing suspended particulates through a filter aid material supported on a septum, wherein said filter aid material comprises a product according to claim 60.

* * * * *